US008578270B2

(12) United States Patent
Chu

(10) Patent No.: US 8,578,270 B2
(45) Date of Patent: Nov. 5, 2013

(54) CLOCK OPERATION METHOD AND MODULE FOR MOBILE TERMINAL

(75) Inventor: Se Youp Chu, Gumi-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 971 days.

(21) Appl. No.: 11/821,053

(22) Filed: Jun. 20, 2007

(65) Prior Publication Data

US 2008/0091968 A1 Apr. 17, 2008

(30) Foreign Application Priority Data

Oct. 12, 2006 (KR) ........................ 10-2006-0099354

(51) Int. Cl.
*G06F 17/00* (2006.01)

(52) U.S. Cl.
USPC ............................ 715/267; 715/255; 715/273

(58) Field of Classification Search
USPC .......................... 715/200, 203, 273, 255, 267
See application file for complete search history.

(56) References Cited

U.S. PATENT DOCUMENTS

| | | | | |
|---|---|---|---|---|
| 5,051,967 | A | 9/1991 | Dismond, III | 368/62 |
| 5,386,398 | A | 1/1995 | Hiemke et al. | 368/10 |
| 5,821,910 | A * | 10/1998 | Shay | 345/99 |
| 6,393,263 | B1 * | 5/2002 | Hayashi | 455/145 |
| 7,146,504 | B2 * | 12/2006 | Parks et al. | 713/178 |
| 7,167,763 | B2 * | 1/2007 | Claar et al. | 700/94 |
| 7,233,349 | B2 * | 6/2007 | Mauger et al. | 348/184 |
| 7,394,726 | B2 * | 7/2008 | O'Neill et al. | 368/21 |
| 2001/0011194 | A1 * | 8/2001 | Claar et al. | 700/94 |
| 2002/0038234 | A1 * | 3/2002 | Fu et al. | 705/8 |
| 2003/0169642 | A1 * | 9/2003 | O'Neill et al. | 368/21 |
| 2003/0233553 | A1 * | 12/2003 | Parks et al. | 713/178 |
| 2006/0158963 | A1 * | 7/2006 | O'Neill et al. | 368/46 |
| 2007/0124819 | A1 * | 5/2007 | Strohwig et al. | 726/26 |
| 2007/0162934 | A1 * | 7/2007 | Roop et al. | 725/50 |
| 2008/0266453 | A1 * | 10/2008 | Fisher | 348/516 |
| 2010/0034190 | A1 * | 2/2010 | Yun et al. | 370/350 |
| 2010/0186042 | A1 * | 7/2010 | Roop et al. | 725/50 |

FOREIGN PATENT DOCUMENTS

| | | | |
|---|---|---|---|
| EP | 1460509 | 9/2004 | G06F 1/00 |
| KR | 2006-44191 | 5/2006 | H04B 1/40 |

* cited by examiner

*Primary Examiner* — Stephen Hong
*Assistant Examiner* — Gregory J Vaughn
(74) *Attorney, Agent, or Firm* — Cha & Reiter, LLC

(57) ABSTRACT

A method and module for a mobile terminal that enable A user to freely create an offset clock and reset the time on the offset clock are disclosed. The clock operation method includes: generating a time offset value using a reference time signal from an internal clock and using a time gap value input by a user while at least one offset clock created in advance is in operation on the basis of the reference time signal; creating a new offset clock using the generated time offset value; and displaying the time of the created new offset clock. As a result, the user can operate a plurality of personalized offset clocks, each of which keeps time relative to a reference clock.

21 Claims, 7 Drawing Sheets

FIG. 2

200

| SEQUENCE NUMBER (201) | CLOCK NAME (202) | OFFSET VALUE (203) | CLOCK ASSOCIATION (204) |
|---|---|---|---|
| 1 | DRM CLOCK | −08:47:50 | NO |
| 2 | STANDARD CLOCK | +00:05:35 | NO |
| 3 | TEN-MINUTE-AHEAD CLOCK I | +00:10:00 | YES |
| 4 | TEN-MINUTE-AHEAD CLOCK II | +00:15:35 | NO |
| 5 | TASHKENT CLOCK | +03:56:25 | YES |

128, 127, 129, 130

CLOCK OPERATION METHOD AND MODULE FOR MOBILE TERMINAL

CLAIM OF PRIORITY

This application claims priority to an application entitled "CLOCK OPERATION METHOD AND MODULE FOR MOBILE TERMINAL," filed in the Korean Intellectual Property Office on Oct. 12, 2006 and assigned Serial No. 2006-0099354, the entire contents of which are incorporated herein by reference.

BACKGROUND OF THE INVENTION

1. Field of the Invention

The present invention relates generally to a mobile terminal and, more particularly, to a clock operation method and module for a mobile terminal that enable the user to create and reset an offset clock for clock personalization.

2. Description of the Related Art

A mobile terminal generally refers to a portable terminal device that can support wireless communication and perform various functions using application programs. A mobile communication terminal, personal digital assistant, smart phone, International Mobile Telecommunications-2000 terminal, and wireless local area network terminal are examples of a mobile terminal.

An advanced mobile terminal can support a variety of functions related to data exchange such as access to Internet, and multimedia processing such as audio file laying and movie viewing.

In addition to the current time, various time values are necessary to support such diverse functions. A mobile terminal includes a real time clock (RTC) as an integrated circuit chip to keep track of the current time. The RTC generates a clock signal of a preset frequency to provide the mobile terminal with time values in hours, minutes and seconds, and date values in days, weeks, months, and years. Additionally, the RTC enables an alarm feature generating an alarm sound at a preset time, and a timer feature measuring the passage of time. A user of the mobile terminal can set or reset the RTC to produce desired types of time and date values.

However, a conventional mobile terminal does not provide a personalized clock that can be freely created and reset as necessary. That is, although the conventional mobile terminal can display the current time and current local times around the world using an RTC, it does not provide a separate clock that keeps time, for example, ten minutes ahead of the current time in a user settable manner.

SUMMARY OF THE INVENTION

The present invention provides a clock operation method and apparatus for a mobile terminal that provides the user with a personalized clock that can be freely created and set as necessary.

In accordance with an exemplary embodiment of the present invention, there is provided a clock operation method for a mobile terminal, including:

inputting a clock setting request while at least one offset clock created in advance is in operation on the basis of a reference time signal from an internal clock;

if the input clock setting request is a clock creation request, performing the steps of— receiving an input time gap value, and generating a time offset value using the reference time signal and the received input time gap value;

creating a new offset clock using the generated time offset value; and displaying the time of the newly created offset clock.

In accordance with another exemplary embodiment of the present invention, there is provided a clock operation module for a mobile terminal, including: a reference clock for generating a reference time signal using an internal clock; an offset data manager for managing at least one time offset value derived using the reference time signal and an input time gap value input; and an offset clock section for creating and operating at least one offset clock using the least one time offset value.

The clock operation module may further include a display unit for displaying the time of the offset clock.

BRIEF DESCRIPTION OF THE DRAWINGS

The above and other features and advantages of the present invention will be more apparent from the following detailed description in conjunction with the accompanying drawings, in which:

FIG. 2 illustrates an offset data table for the mobile terminal of FIG. 1;

DETAILED DESCRIPTION OF THE INVENTION

Figure 1:
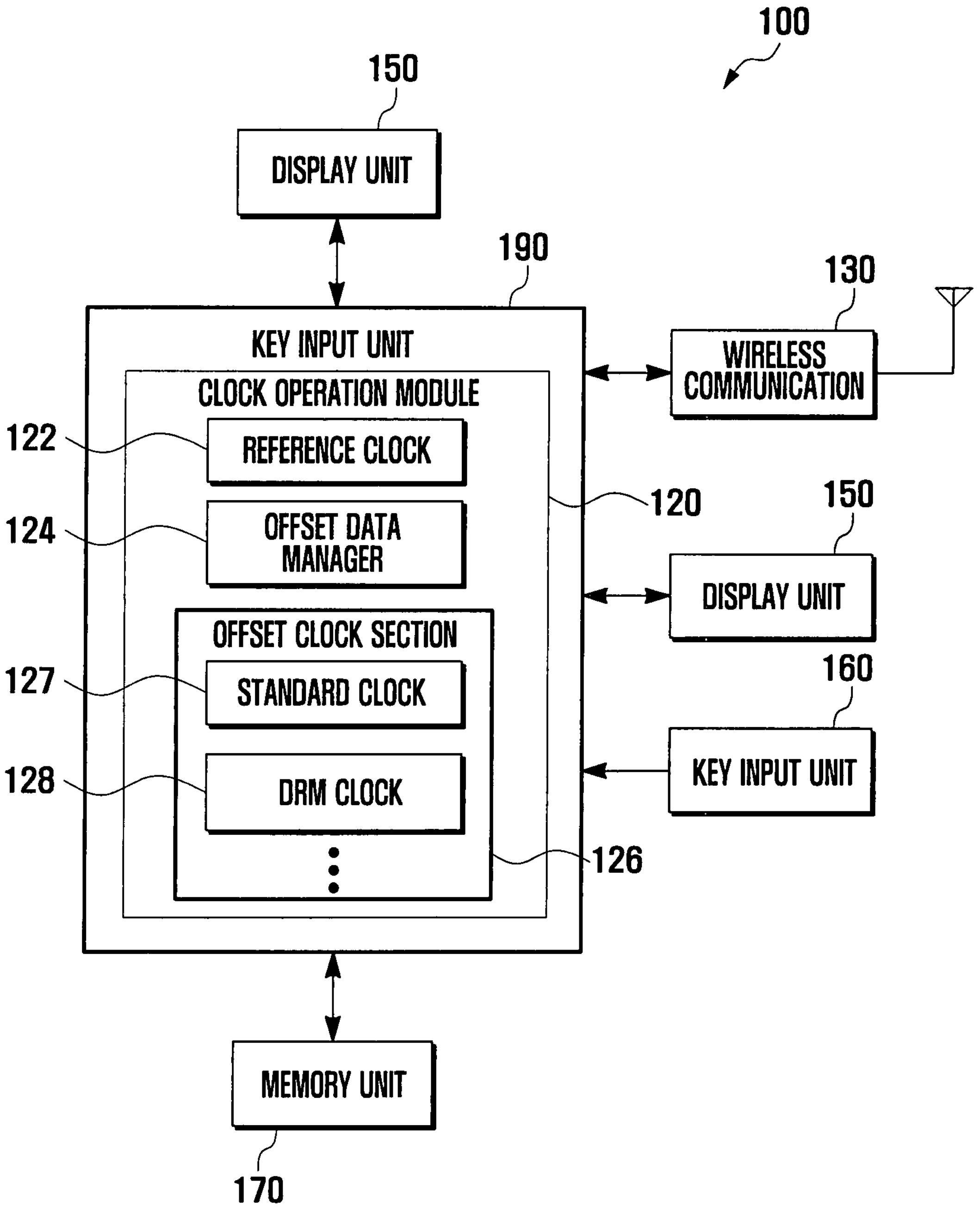
FIG. 1 illustrates a configuration of a mobile terminal having a clock operation module according to an exemplary embodiment of the present invention.

Hereinafter, exemplary embodiments of the present invention are described in detail with reference to the accompanying drawings. The same reference symbols identify the same or corresponding elements in the drawings. Detailed descriptions of constructions or processes known in the art may be omitted to avoid obscuring the invention in unnecessary detail.

FIG. 1 illustrates a configuration of a mobile terminal having a clock operation module according to an exemplary embodiment of the present invention.

Referring to FIG. 1, the mobile terminal 100 includes a wireless communication unit 130, audio processor 140, display unit 150, key input unit 160, memory unit 170, and control unit 190. The control unit 190 includes a clock operation module 120 of the present invention.

The wireless communication unit 130 performs wireless data transmission and reception operations for the mobile terminal 100. The wireless communication unit 130 may include a radio frequency (RF) transmitter for upconverting the frequency of a signal to be transmitted and amplifying the signal, and an RF receiver for low-noise amplifying a received signal and downconverting the frequency of the received signal. The wireless communication unit 130 sends data received through a wireless channel to the control unit 190, and transmits data from the control unit 190 through a wireless channel.

The audio processor 140 may include a coder/decoder (codec). The codec may have a data codec for processing packet data and the like, and an audio codec for processing an audio signal such as a voice signal. During call processing, the audio processor 140 converts a digital audio signal from the control unit 190 into an analog signal through the audio codec to reproduce the analog signal through a speaker, and converts an analog audio signal from a microphone into a digital audio signal through the audio codec to provide the digital audio signal to the control unit 190.

The display unit 150 displays an image signal from the control unit 190 on a screen. The display unit 150 may include a panel of liquid crystal display (LCD) devices, an LCD controller, and a video memory for storing video data. If the panel has a touch screen capability, the display unit 150 can also act as an input means.

The key input unit 160 receives a key signal from the user to control operations of the mobile terminal 100, and sends the received key signal to the control unit 190.

The clock operation module 120 creates and manages various clocks in the mobile terminal 100. The clock operation module 120 includes a reference clock 122, offset data manager 124, and offset clock section 126. The offset clock section 126 includes a standard clock 127 and digital rights management (DRM) clock 128.

The reference clock 122 generates a reference time signal using an internal clock. The reference time signal is unalterable and used only inside the mobile terminal 100, and therefore a user cannot directly use the reference time signal.

The reference clock 122 preferably includes an oscillator (not shown) for generating a reference clock signal having a preset frequency, an RTC (not shown) for creating a reference time signal using the reference clock signal.

In the description, the term 'time' may refer to a date-time value including both a time value in hours, minutes and seconds, and a date value in days, weeks, months and years.

The offset data manager 124 manages offset data. When the user inputs a time gap value for creation of an offset clock, the offset data manager 124 generates a time offset value using the input time gap value and stores the generated time offset value in an offset data table (described subsequently) 200.

In the present invention, an offset clock maintains time as an offset from a time selected from the group consisting of the reference clock 122 and the standard clock 127, and can be created and removed if necessary. An offset clock can be created through inputting a time gap value, and resetting the time on the created offset clock if necessary. A plurality of offset clocks may be created and used.

The offset clock section 126 creates and manages an offset clock using a corresponding offset record stored in the offset data table. The offset clock section 126 constantly manages at least two offset clocks: the standard clock 127 and DRM clock 128.

The standard clock 127 is an offset clock for displaying the current time on the mobile terminal 100. Whereas a user can reset the time on the standard clock 127, the user cannot remove the standard clock 127 itself.

The DRM clock 128 is an offset clock for enabling utilization of a DRM content such as a time-bound content, and is not removable by the user. The DRM clock 128 has an encryption key for authentication to prevent unauthorized resetting of the DRM time. The time on the DRM clock 128 cannot be reset with ordinary key input from the user, and can only be reset through an authentication procedure performed by an authentication server (not shown). That is, if the time on the DRM clock 128 is different from that on the authentication server, the encryption key is utilized by the DRM authentication server to reset the time on the DRM clock 128.

As the standard clock 127 and DRM clock 128 are constantly utilized, they are preferably created in advance during the manufacturing process.

The offset clock section 126 can manage a plurality of offset clocks created according to a plurality of user requests, and feed the reference time signal from the reference clock 122 in real-time to the created offset clocks for displaying various types of time values. An offset clock may also be dynamically created on demand according to a time display request.

The memory unit 170 includes a program memory section and a data memory section. The program memory section stores programs for controlling the overall operation of the mobile terminal 100, and the data memory section stores data resulting from execution of the programs. In particular, the memory unit 170 stores an offset data table 200 that is used for offset clock creation and management.

FIG. 2 illustrates an offset data table 200. The offset data table includes a plurality of offset records. An offset record includes a sequence number field, clock name field, offset value field, and clock association field.

The sequence number field 201 stores a sequence number, which is automatically set by the offset data manager 124, assigned to an offset clock.

The clock name field 202 stores a descriptive name, which is input by the user, given to the offset clock.

The offset value field 203 stores a time offset value corresponding to a time gap value input by the user. The clock association field 204 indicates which of the standard clocks 127 and the reference clock 122 is associated with the offset clock. For example, in the offset data table 200 of FIG. 2, a value of 'YES' in the clock association field 204 indicates that the time on the corresponding offset clock is associated with the time on the standard clock 127; and a value of 'NO' in the clock association field 204 indicates that the time on the corresponding offset clock is associated with the time on the reference clock 122.

If the offset clock is associated with the standard clock 127, the time offset value in the offset value field 203 is identical to the input time gap value. If the offset clock is associated with the reference clock 122, the time offset value is an offset value generated using the input time gap value. The time on the offset clock is an offset, given by the time offset value 203, from the time on one of the standard clock 127 and reference clock 122.

The control unit 190 controls operations of the mobile terminal 100 related to communication and supplementary functions. The control unit 190 controls the mobile terminal 100 on the basis of key signals from the key input unit 160 and control programs stored in the memory unit 170.

Figure 3:
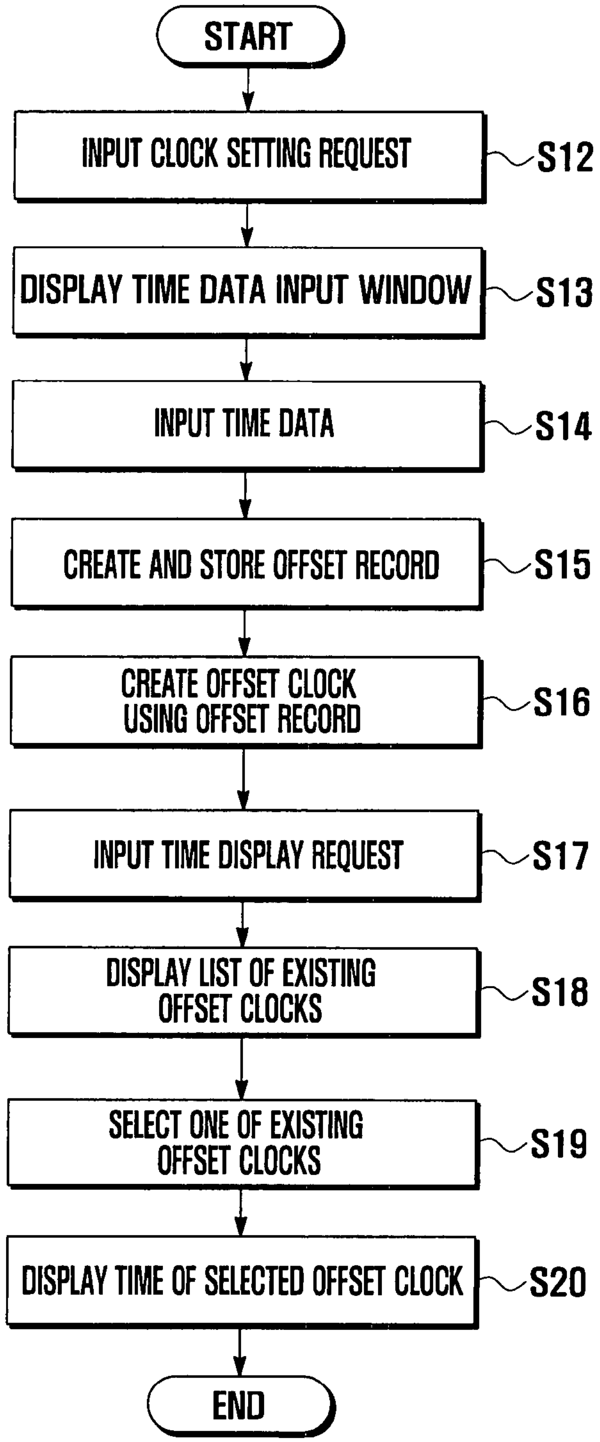
FIG. 3 is a flow chart illustrating a clock operation method according to another exemplary embodiment of the present invention.
Figure 4A:
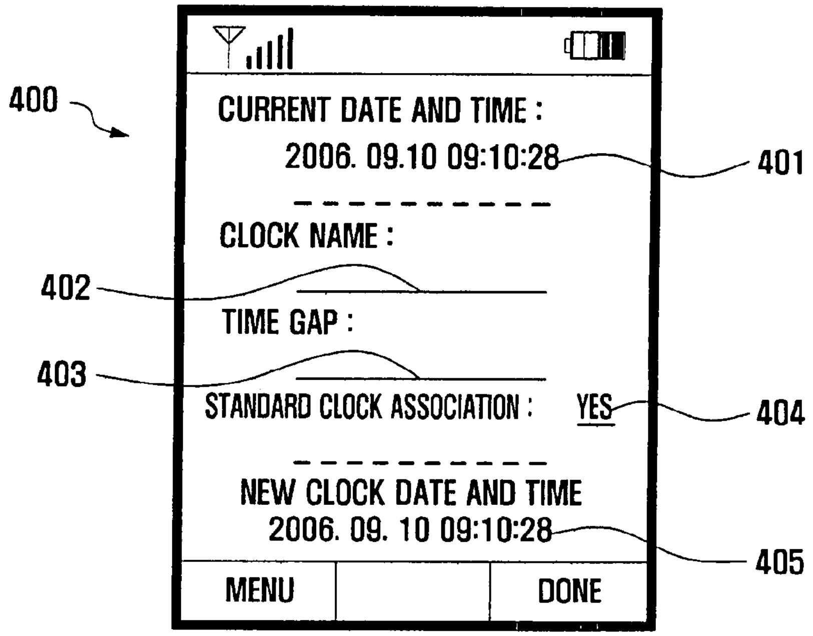
FIGS. 4A and 4B illustrate screen representations for time data input.
Figure 4B:
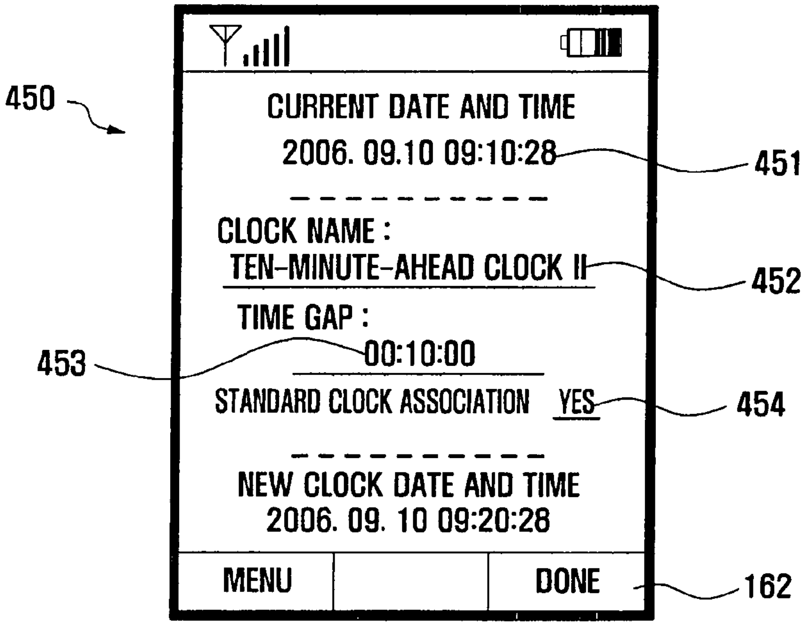

FIG. 3 is a flow chart illustrating a clock operation method according to another exemplary embodiment of the present invention. FIGS. 4A and 4B illustrate screen representations for time data input. Referring to FIGS. 1 to 4B, the clock operation method is described as follows.

When the user of the mobile terminal 100 inputs a clock setting request through the key input unit 160 or the like at step S12, the control unit 190 controls the display unit 150 to display a time data input window as illustrated in FIG. 4A at step S13. The user inputs time data through the displayed time data input window, as illustrated in FIG. 4B at step S14.

The time data input window 400 of FIG. 4A, which corresponds to an offset record of the offset data table 200 of FIG. 2, includes fields related to current time display 401, clock name input 402, time gap input 403, associated clock selection 404, and new clock time display 405. A current date-time value based on the standard clock 127 is displayed in the corresponding field 405.

The time data input window 450 of FIG. 4B indicates that the user inputs 'ten-minute-ahead clock II' for a clock name 451, '00:10:00' (hour:minute:second) for a time gap 453 between the time on the clock to be created and that on the standard clock 127, and 'NO' 454 for association with the reference clock 122. After user input, the control unit 190 displays a new date-time value obtained by adding the input time gap value to the current date-time value 451.

When the user completes input of the time data by selecting a 'done' icon 162 in the time data input window, the offset data manager 124 creates an offset record using the time data input by the user, and stores the created offset record in the offset data table 200 at step S15.

In creation of the offset record, if the clock association is 'YES', the time gap value input by the user is stored, without modification, in the offset value field 203. If the clock association is 'NO', the time gap value input by the user is changed and then stored in the offset value field 203.

For example, the reference time value based on the reference clock 122 is assumed to be '00:01:00'. In FIG. 2, for the standard clock 127 associated with the second offset record, adding the time offset value of '+00:05:35' to the reference time value of '00:01:00' gives the current standard time value of '00:06:35'.

For an offset clock 'ten-minute-ahead clock I' associated with the third offset record 129, the time gap value input by the user is '00:10:00' (10 minutes), and the associated clock is the standard clock 127 ('YES' in the clock association field 204). Hence, the time gap value of '00:10:00' is copied to the corresponding offset value field 203 as the time offset value, and adding the time offset value of '+00:10:00' to the standard time value of '00:06:35' gives a time value of '00:16:35'. That is, the offset clock 'ten-minute-ahead clock I' 129 keeps time ten minutes ahead of the time on the standard clock 127. If the user resets the time on the standard clock 127, the time on the offset clock 'ten-minute-ahead clock I' 129 is also reset accordingly.

For an offset clock 'ten-minute-ahead clock II' associated with the fourth offset record 130, the time gap value input by the user is '00:10:00' (10 minutes), and the associated clock is the reference clock 122 ('NO' in the clock association field 204). The offset data manager 124 calculates an intermediate time value of '00:16:35' by adding the time gap value of '00:10:00' to the current time value of '00:06:35' based on the standard clock 127, obtains the time offset value of '+00:15:35' by calculating the difference between the intermediate time value of '00:16:35' and the reference time value of '00:01:00' based on the reference clock 122, and stores the time offset value of '+00:15:35' in the offset value field 203.

Thereafter, the offset clock section 126 creates an offset clock for each offset record in the offset data table 200 at step S16. When a new offset record is stored, a corresponding new offset clock is created.

At step S16, after creation of a new offset clock, the offset clock section 126 checks the value of the clock association field 204 in the associated offset record to set the time on the newly created offset clock.

If the value of the clock association field 204 is 'YES', the offset clock section 126 sets, to the time on the newly created offset clock, a time value that is obtained by adding the corresponding time offset value 203 to the time value of the standard clock 127. The new offset clock keeps time relative to the time on the standard clock 127. Hence, if the time on the standard clock 127 is reset, the time on the new offset clock is also reset accordingly when it is used and is nowhere saved in the memory.

If the value of the clock association field 204 is 'NO', the offset clock section 126 sets, to the time on the newly created offset clock, a time value that is obtained by adding the corresponding time offset value 203 to the time value of the reference clock 122. The new offset clock keeps time relative to the time of the reference clock 122. Hence, resetting of the time on the standard clock 127 does not affect the time on the new offset clock.

The created offset clocks are operated and managed by the offset clock section 126 according to the reference time signal from the reference clock 122.

Thereafter, when the user inputs a clock display request at step S17, the offset clock section 126 displays a clock list of existing offset clocks at step S18. When the user selects an offset clock in the clock list at step S19, the offset clock section 126 computes and displays the date and time based on the selected offset clock through the display unit 150 for the user at step S20.

In offset clock display, time and date values of existing offset clocks may also be displayed in a list of pairs of clock name and time-date value.

Figure 5A:
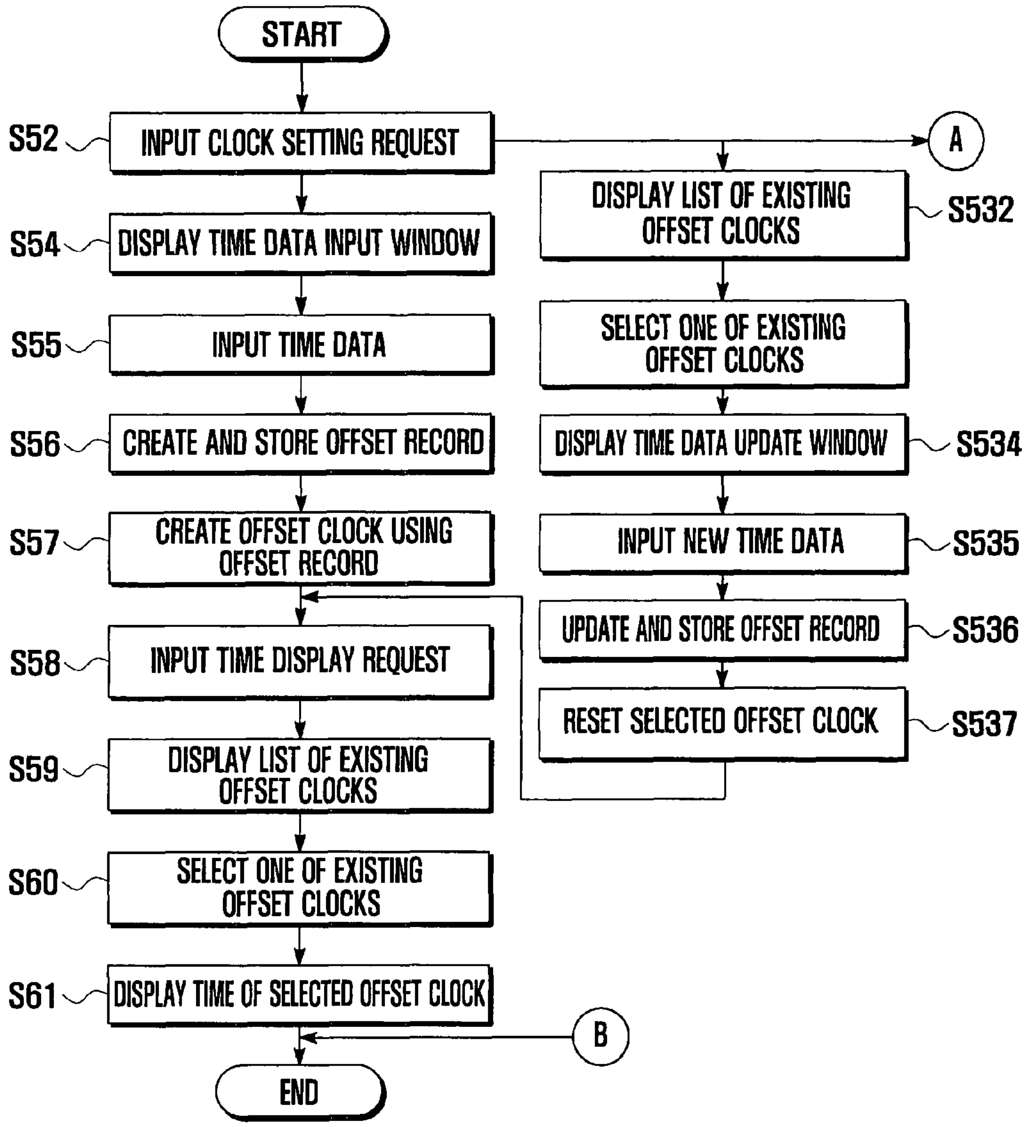
FIG. 5A to 5B are flow charts illustrating a clock operation method according to another exemplary embodiment of the present invention.
Figure 5B:
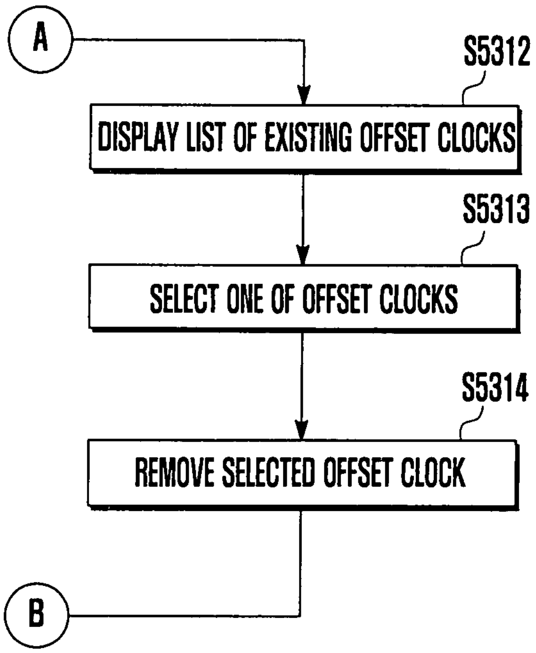
Figure 6:
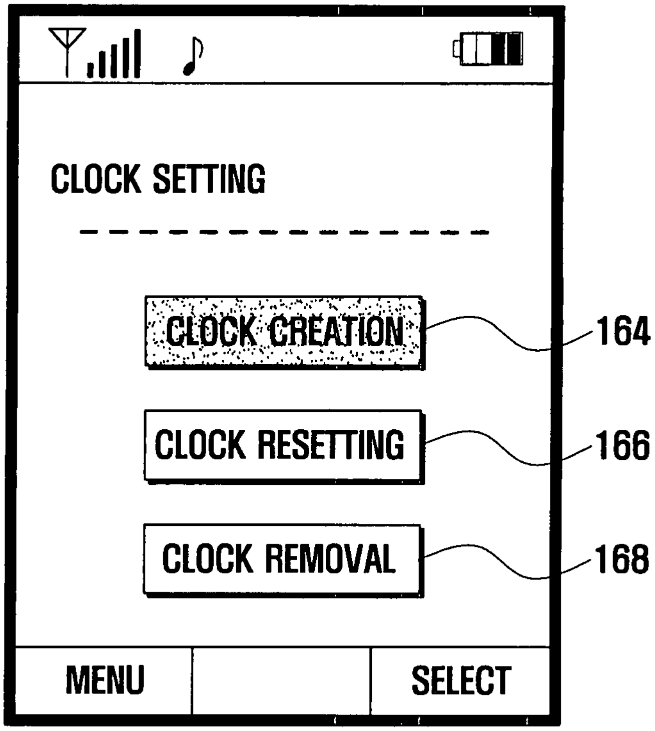
FIG. 6 illustrates a screen representation for a clock setting operation.

FIG. 5A to 5B are flow charts illustrating a clock operation method according to another exemplary embodiment of the present invention. FIG. 6 illustrates a screen representation for a clock setting operation. Referring to FIGS. 1, 2, 5A to 5B and 6, the clock operation of this other exemplary method is described as follows.

When the user of the mobile terminal 100 inputs a clock setting request through the key input unit 160 or the like at step S52, the control unit 190 controls the display unit 150 to display a clock setting window as illustrated in FIG. 6. The clock setting window includes menu items for clock creation 164, clock resetting 166, and clock removal 168. When the user selects one of the menu items in the clock setting window at step S53, the control unit 190 performs operations corresponding to the selected menu item.

If the clock creation menu item 164 is selected at step S53, the control unit 190 performs operations related to offset clock creation and time display. Steps S54 to S61 of FIG. 5A to 5B for offset clock creation and time display correspond to steps S13 to S20 of FIG. 3, and a description thereof is omitted.

If the clock resetting menu item 166 is selected at step S53, the control unit 190 displays a clock list of existing offset clocks at step S532. When the user selects an offset clock in the clock list at step S533, the control unit 190 notifies the offset data manager 124 of the selected offset clock for resetting.

When the offset data manager 124 displays on the display unit 150 a time data update window using an offset record associated with the selected offset clock at step S534, the user changes data values in the time data update window at step S535 by inputting new time data.

The time data update window is identical in structure to the time data input window described previously in connection with FIG. 4B. Hence, the user can change data values related to the clock name, time gap, and associated clock of the selected offset clock.

When the user completes data change by entering the 'done' key, the offset data manager 124 updates the corresponding offset record with the changed data values at step S536.

Thereafter, the offset clock section 126 resets the selected offset clock using the updated offset record at step S537, and operates the selected offset clock according to the reference time signal from the reference clock 122.

If the clock removal menu item 168 is selected at step S53, the control unit 190 displays a clock list of existing offset clocks at step S531. When the user selects an offset clock to be removed in the clock list at step S5313, the offset data manager 124 deletes an offset record associated with the selected offset clock from the offset data table 200, and removes the selected offset clock through the offset clock section 126 at step S5314.

As apparent from the above description, the present invention provides a clock operation method and module for a mobile terminal that enables the user to freely create an offset clock and reset the time on the offset clock. As a result, the user can operate a plurality of personalized offset clocks, each of which dynamically keeps time relative to a reference clock.

While preferred embodiments of the present invention have been shown and described in this specification, it will be understood by those skilled in the art that various changes or modifications of the embodiments are possible without departing from the spirit and scope of the invention as defined by the appended claims. For example, although, in the description, the clock operation module is implemented as part of the control unit, it may also be implemented as a separate entity. In addition, although the description is focused upon a mobile terminal, the clock operation method and module of the present invention may also be applicable to any electronic apparatus having a digital clock.

What is claimed is:

1. A method for operating a clock of a mobile terminal including an input unit and a display unit, comprising the steps of:

generating a time offset value using a selected time gap value, input to the input unit, while a standard clock keeps track of a current time local to the mobile terminal and is in operation on the basis of a reference clock generating a reference time signal using an internal clock;

receiving a clock association value input to the input unit and indicating that either the standard clock is to be used or the reference clock is to be used;

receiving a selected offset clock name input to the input unit;

creating a new offset clock with the selected offset clock name using the generated time offset value; and displaying the time and the corresponding selected offset clock name of the created new offset clock on the display unit, wherein the created new offset clock operates based on the standard clock when the clock association value indicates that the standard clock is to be used, and the reference clock when the clock association value indicates that the reference clock is to be used.

2. The method of claim 1, wherein the reference time signal is unalterable.

3. The method of claim 1, wherein the created new offset clock keeps time according to the reference time signal if the clock association value indicates not the standard clock.

4. The method of claim 3, wherein the time of the newly created offset clock is set to a time value of the time offset value plus the time associated with the reference time signal.

5. The method of claim 1, wherein the standard clock is not removed by a selection inputted to the input unit but can be reset by the inputted selection.

6. The method of claim 1, wherein the time offset value is equal to the time gap value if the clock association value indicates the standard clock.

7. The method of claim 6, wherein the time of the created new offset clock is set to a time value of the time offset value plus the time on the standard clock.

8. The method of claim 1, wherein the generating a time offset value step further comprises the steps of:

displaying a time data input window;

inputting the time gap value and the corresponding clock association value through the time data input window; and producing the time offset value using the input time gap value.

9. The method of claim 8, further comprising the step of displaying a current time value based on the standard clock in the time data input window.

10. The method of claim 1, further comprising the step of inputting a clock setting request prior to the generating a time offset value step.

11. The method of claim 10, further comprising the step of whenever the input clock setting request is a clock creation request, the generating a time offset value step is performed.

12. The method of claim 10, further comprising the step of performing, if the input clock setting request is a clock reset request, a clock reset procedure.

13. The method of claim 12, wherein the performing a clock reset procedure further comprises the steps of:

displaying a clock list of existing offset clocks;

displaying, upon selection of an offset clock to be reset from the clock list, a time data update window for the selected offset clock;

inputting a new time gap value for the displayed selected offset clock through the time data update window;

producing a new time offset value using the input new time gap value; and resetting the time of the selected offset clock using the new time offset value.

14. The method of claim 10, further comprising the step of whenever the input clock setting request is a clock deletion request, performing a clock deletion procedure, comprising the steps of:

displaying a clock list of existing offset clocks;

selecting an offset clock to be removed from the displayed clock list; and deleting the selected offset clock and a time offset value associated with the selected offset clock.

15. The method of claim 1, wherein the displaying the time step further comprises:

displaying, in response to input of a clock display request, a clock list of existing offset clocks;

selecting an offset clock in the displayed clock list; and displaying the time of the selected offset clock.

16. A mobile terminal having a clock operation module, an input unit, and a display unit, the clock operation module comprising:

a reference clock for generating a reference time signal using an internal clock;

an offset data manager for receiving a clock association value input to the input unit, with the clock association value indicating that either a standard clock is to be used or the reference clock is to be used, and for managing at least one time offset value derived using the reference time signal and a selected time gap value input to the input unit; and an offset clock section for constantly operating the standard clock for keeping track of a current time local to the mobile terminal, for creating and operating at least one offset clock having a selected offset clock name input to the input unit, and for displaying, on the display unit, the at least one offset clock and the corresponding selected offset clock name, with the at least one offset clock using the at least one time offset value and the clock association value, the offset clock section comprises a standard clock for keeping track of a current time, and constantly operating, wherein the at least one created offset clock operates based on the standard clock when the clock association value indicates that the standard clock is to be used and the reference clock when the clock association value indicates that the reference clock is to be used.

17. The mobile terminal of claim 16, wherein the reference time signal from the reference clock is unalterable.

18. The mobile terminal of claim 16, wherein the standard clock is not removed by a selection inputted to the input unit, but the time on the standard clock can be reset by the inputted selection.

19. The mobile terminal of claim 16, wherein the offset clock section further comprises a clock for digital rights management (DRM).

20. The mobile terminal of claim 19, wherein the DRM clock has an internal encryption key for authentication, and is resettable only when an externally provided encryption key coincides with the internal encryption key.

21. The mobile terminal of claim 16, further comprising:

an input unit for receiving a selection of an offset clock from a displayed clock list;

wherein the display unit displays, in response to input of a clock display request in the input unit, the clock list of existing offset clocks, and in response to the inputted selection of the offset clock, displays the time of the selected offset clock.

* * * * *